(12) United States Patent
Lin et al.

(10) Patent No.: US 11,087,754 B2
(45) Date of Patent: Aug. 10, 2021

(54) INTELLIGENT VOICE SYSTEM AND METHOD FOR CONTROLLING PROJECTOR BY USING THE INTELLIGENT VOICE SYSTEM

(71) Applicant: Coretronic Corporation, Hsin-Chu (TW)

(72) Inventors: Ming-Cheng Lin, Hsin-Chu (TW); Yu-Meng Chen, Hsin-Chu (TW); Wei-Hsin Kan, Hsin-Chu (TW); Ji-Cheng Dai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 326 days.

(21) Appl. No.: 16/228,798

(22) Filed: Dec. 21, 2018

(65) Prior Publication Data

US 2020/0105259 A1   Apr. 2, 2020

Related U.S. Application Data

(60) Provisional application No. 62/737,126, filed on Sep. 27, 2018.

(30) Foreign Application Priority Data

Oct. 15, 2018   (CN) .......................... 201811196721.9

(51) Int. Cl.
*G10L 21/00*       (2013.01)
*G10L 15/22*       (2006.01)
(Continued)

(52) U.S. Cl.
CPC .............. *G10L 15/22* (2013.01); *G06F 3/167* (2013.01); *G10L 15/30* (2013.01); *G10L 2015/223* (2013.01)

(58) Field of Classification Search
CPC ... G10L 15/22; G10L 15/30; G10L 2015/223; G10L 15/28; G06F 3/167; G06F 3/0346;
(Continued)

(56) References Cited

U.S. PATENT DOCUMENTS 5,724,526 A   3/1998 Kunita
6,125,341 A   9/2000 Raud et al.
(Continued)

FOREIGN PATENT DOCUMENTS

CN   106782522   5/2017
CN   107205075   9/2017
(Continued)

OTHER PUBLICATIONS

Joshua Wissbroecker et al., "Early Lessons from a Voice-Only Interface for Finding Movies," arXiv.org, Cornell University Library, Aug. 29, 2018, pp. 1-2.
(Continued)

*Primary Examiner* — Md S Elahee
(74) *Attorney, Agent, or Firm* — JCIPRNET

(57) ABSTRACT

The disclosure provides an intelligent voice system and a method for controlling a projector. The system includes a voice assistant, a cloud service platform, a projector, and a management server. When the voice assistant receives a voice signal for controlling a video platform interface, the voice assistant extracts keywords from the voice signal and forwards the keywords to the cloud service platform, wherein the keywords include an alias corresponding to the projector and a first interface control command. The cloud service platform analyzes the first interface control command, acquires the corresponding second interface control command according to the first interface control command, and transmits the alias of the projector and the corresponding second interface control command to the management
(Continued)

server. The management server accesses the projector in response to the alias and adjusts a projection situation of the video platform interface projected by the projector.

22 Claims, 11 Drawing Sheets

(51) Int. Cl.
*G06F 3/16* (2006.01)
*G10L 15/30* (2013.01)

(58) Field of Classification Search
CPC ........... H04N 21/6377; H04N 21/6582; H04N 21/414; H04N 21/47202; H04N 21/42203; G06Q 20/20
USPC ................................................ 1/1; 704/275
See application file for complete search history.

(56) References Cited

U.S. PATENT DOCUMENTS

| | | |
|---|---|---|
| 10,185,544 B1 | 1/2019 | Mutagi et al. |
| 10,498,883 B1 | 12/2019 | Krebs et al. |
| 10,600,414 B1 | 3/2020 | Wang et al. |
| 2007/0064199 A1 | 3/2007 | Schindler et al. |
| 2010/0100849 A1 | 4/2010 | Fram |
| 2010/0131280 A1 | 5/2010 | Bogineni |
| 2010/0198578 A1 | 8/2010 | Tachimori |
| 2011/0004327 A1* | 1/2011 | Bonnat ................. G06F 3/0346 700/83 |
| 2011/0313774 A1 | 12/2011 | Ji et al. |
| 2012/0059655 A1 | 3/2012 | Cartales |
| 2013/0085743 A1 | 4/2013 | Koo et al. |
| 2015/0006147 A1 | 1/2015 | Schmidt |
| 2015/0142420 A1 | 5/2015 | Sarikaya et al. |
| 2015/0154976 A1 | 6/2015 | Mutagi |
| 2015/0235642 A1 | 8/2015 | Nishikawa et al. |
| 2015/0371628 A1 | 12/2015 | Kreifeldt |
| 2015/0382047 A1 | 12/2015 | Van Os et al. |
| 2016/0071486 A1 | 3/2016 | Byers et al. |
| 2016/0203456 A1* | 7/2016 | Herring ................ G06Q 20/209 705/24 |
| 2016/0271490 A1 | 9/2016 | Tamura et al. |
| 2017/0038917 A1 | 2/2017 | Reicher et al. |
| 2017/0092272 A1 | 3/2017 | Bargetzi et al. |
| 2017/0329573 A1 | 11/2017 | Mixter |
| 2018/0150280 A1 | 5/2018 | Rhee et al. |
| 2018/0165061 A1 | 6/2018 | Nicolich-Henkin et al. |
| 2018/0190264 A1 | 7/2018 | Mixter et al. |
| 2018/0232202 A1* | 8/2018 | Tagawa .................. G06F 3/167 |
| 2018/0240456 A1 | 8/2018 | Jeong |
| 2019/0019504 A1 | 1/2019 | Hatambeiki |
| 2019/0065478 A1 | 2/2019 | Tsujikawa et al. |
| 2019/0075167 A1 | 3/2019 | Je et al. |
| 2019/0090056 A1 | 3/2019 | Rexach et al. |
| 2019/0102145 A1 | 4/2019 | Wilberding et al. |
| 2019/0147851 A1 | 5/2019 | Kizuki et al. |
| 2019/0172461 A1 | 6/2019 | Jin |
| 2019/0179606 A1* | 6/2019 | Thangarathnam ...... G06F 3/167 |
| 2019/0179611 A1 | 6/2019 | Wojogbe et al. |
| 2019/0206411 A1 | 7/2019 | Li et al. |
| 2019/0229945 A1 | 7/2019 | Suyama |
| 2019/0245713 A1 | 8/2019 | Lo et al. |
| 2019/0295542 A1 | 9/2019 | Huang et al. |
| 2019/0335020 A1 | 10/2019 | Luo et al. |
| 2019/0355365 A1 | 11/2019 | Kim et al. |
| 2019/0371315 A1 | 12/2019 | Newendorp et al. |
| 2019/0384542 A1 | 12/2019 | Tomioka |
| 2020/0051554 A1 | 2/2020 | Kim et al. |
| 2020/0089469 A1 | 3/2020 | Wilberding et al. |
| 2020/0089753 A1 | 3/2020 | Kitai |

FOREIGN PATENT DOCUMENTS

| | | |
|---|---|---|
| CN | 107924681 | 4/2018 |
| DE | 102017204569 | 9/2018 |

OTHER PUBLICATIONS

David Isbitski, "How to Control Your Content with the Video Skill API," Jun. 8, 2017, pp. 1-13. Available at: https://developer.amazon.com/blogs/alexa/post/1314314b-9b98-4501-9032472c000a59b5/how-to-control-your-content-with-the-video-skill-api.

"Search Report of Europe Counterpart Application," dated Oct. 2, 2019, pp. 1-7.

Alexa Skills Kit, "Understand the Smart Home Skill API," Dec. 8, 2017, pp. 1-5.Available at: https://developer.amazon.com/docs/smarthome/understand-the-smart-home-skill-api.html.

Alexa Skills Kit, "Develop Smart Home Skills for Multiple Languages," Dec. 8, 2017, pp. 1-7.Available at: https://developer.amazon.com/docs/smarthome/develop-smart-home-skills-in-multiple-languages.html.

"Office Action of U.S. Related Application, U.S. Appl. No. 16/228,793", dated Aug. 13, 2020, p. 1-p. 46.

"Search Report of Europe Related Application, application No. 19161914.7", dated Oct. 14, 2019, pp. 1-9.

* cited by examiner

INTELLIGENT VOICE SYSTEM AND METHOD FOR CONTROLLING PROJECTOR BY USING THE INTELLIGENT VOICE SYSTEM

CROSS-REFERENCE TO RELATED APPLICATION

This application claims the priority benefits of U.S. provisional application Ser. No. 62/737,126, filed on Sep. 27, 2018 and China application serial no. 201811196721.9, filed on Oct. 15, 2018. The entirety of each of the above-mentioned patent applications is hereby incorporated by reference herein and made a part of this specification.

BACKGROUND

Technical Field

The disclosure relates to an intelligent voice system and a control method, and in particular, to an intelligent voice system and a method for controlling a projector by using the intelligent voice system.

Description of Related Art

With the development of technology, intelligent devices such as intelligent voice assistants and intelligent furniture have become increasingly popular. The intelligent voice assistant allows a user to complete the assigned task simply through a vocal conversation and can thus effectively improve the efficiency of work execution.

In some applications, the user can control the intelligent voice assistant to control part of the intelligent furniture (e.g., air conditioners, lights, etc. in a space) on his/her behalf by sending a voice signal to the intelligent voice assistant, which allows the user to control the intelligent furniture in a more convenient and intuitive manner.

However, no technical means is provided in the related art for the user to control a projector through the intelligent voice assistant. Therefore, for people skilled in the art, how to design a system that allows the intelligent voice assistant to control the projector in response to the user's voice signal has become an issue in the art.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure were acknowledged by a person of ordinary skill in the art.

SUMMARY

In view of the above, the disclosure provides an intelligent voice system and a method for controlling a projector by using the intelligent voice system, which can be used to solve the above technical problem.

The disclosure provides an intelligent voice system including a voice assistant, a cloud service platform, a projector, and a management server. The cloud service platform is connected to and manages the voice assistant. The projector is configured to project a video platform interface. The management server is connected to the cloud service platform and the projector and is configured to manage and control the projector. When the voice assistant receives a first voice signal for controlling the video platform interface, the voice assistant extracts a plurality of first keywords from the first voice signal and forwards the plurality of first keywords to the cloud service platform, wherein the plurality of first keywords includes an alias corresponding to the projector and a first interface control command. The cloud service platform includes a semantic analyzing program and the cloud service platform includes a plurality of second interface control commands. The cloud service platform analyzes the first interface control command according to the semantic analyzing program, acquires the corresponding second interface control command according to the first interface control command, and transmits the alias of the projector and the second interface control command corresponding to the first interface control command to the management server. The management server accesses the projector in response to the alias and adjusts a projection situation of the video platform interface projected by the projector.

The disclosure provides a method for controlling a projector adapted for the above intelligent voice system. The method includes the following steps. When the voice assistant receives a first voice signal for controlling the video platform interface, the voice assistant extracts a plurality of first keywords from the first voice signal and forwards the plurality of first keywords to the cloud service platform, wherein the plurality of first keywords includes an alias corresponding to the projector and a first interface control command, wherein the cloud service platform includes a semantic analyzing program and the cloud service platform includes a plurality of second interface control commands. The cloud service platform analyzes the first interface control command according to the semantic analyzing program, acquires the corresponding second interface control command according to the first interface control command, and transmits the alias of the projector and the second interface control command corresponding to the first interface control command to the management server. The management server accesses the projector in response to the alias and adjusts a projection situation of the video platform interface projected by the projector.

In light of the above, the method for controlling a projector provided in the disclosure allows the user to control the projection situation of the video platform interface projected by the projector by saying the voice signal to the voice assistant to thereby provide a novel, intuitive, and convenient projector control system.

Other objectives, features and advantages of the disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
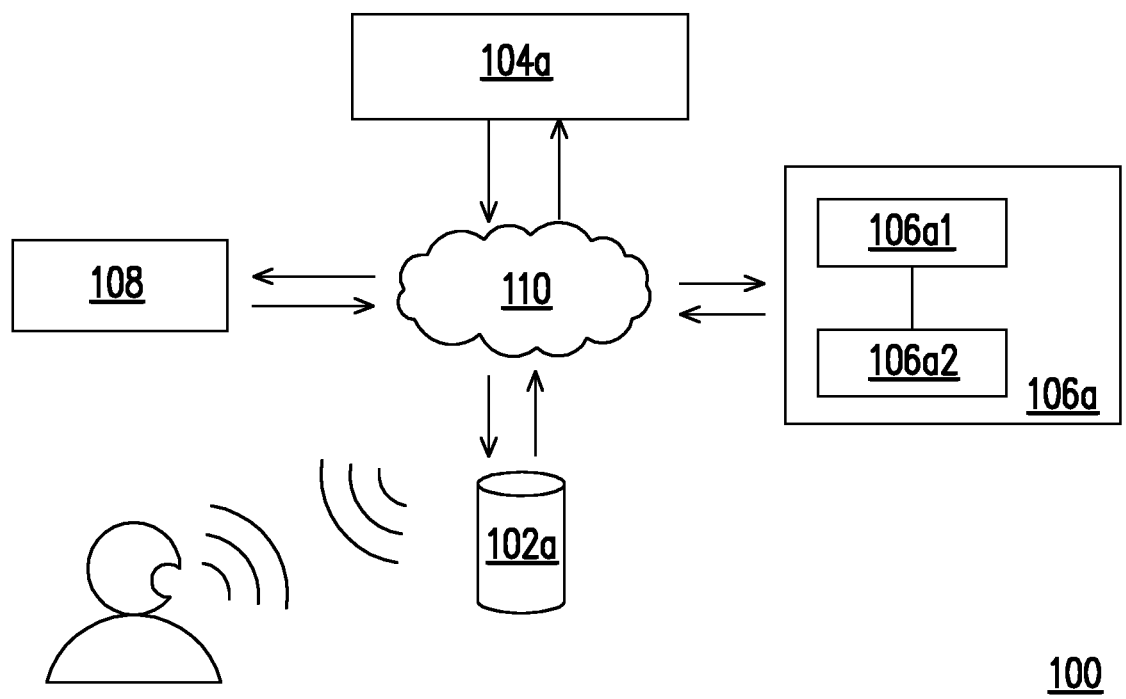
FIG. 1 is a schematic diagram illustrating an intelligent voice system according to an embodiment of the disclosure.

Referring to FIG. 1, FIG. 1 is a schematic diagram illustrating an intelligent voice system according to an embodiment of the disclosure. As shown in FIG. 1, an intelligent voice system 100 includes a voice assistant 102a, a cloud service platform 104a, a projector 106a, and a management server 108. The above devices may all be connected to each other via a network (Internet) 110. "Connection" is defined herein as mutual transmission of signals.

In the present embodiment, the projector 106a includes a controller 106a1 and a light source device 106a2. The voice assistant 102a is, for example, an external device connected to the projector 106a via a signal. The voice assistant 102a includes a microphone, a speaker, and a wireless network medium and/or a wired network medium (e.g., a network card or a relevant dongle; it is not limited to transmission using Bluetooth, Wi-Fi, Zigbee, or another wireless transmission medium, and it is also not limited to transmission using optical fibers or another wired transmission interface). The voice assistant 102a is, for example, a smart speaker (e.g., Amazon Echo produced by Amazon™ or Google Assistant produced by Google, but is not limited thereto), or another intelligent device that allows a user to use a voice signal AS1 to represent an input command and perform a corresponding operation. Alternatively, the voice assistant 102a may also be a voice circuit device built in the projector 106a. The voice circuit device includes, for example, a voice recognition processor, an artificial intelligence processing unit (AI processing chip), or a neural-network processing unit (neural-network processing chip). In different embodiments, before the user instructs the voice assistant 102a to perform a specific operation through the voice signal, the user may first say a specific wake-up word to the voice assistant 102a to wake up the voice assistant 102a. The so-called "waking up" means turning on or starting. For example, if the voice assistant 102a is Amazon Echo, the user may say wake-up words such as "Alexa" and/or "Echo" to the voice assistant 102a to wake up the voice assistant 102a. In addition, if the voice assistant 102a is Google Assistant, the user may say wake-up words such as "OK Google" and/or "Hey Google" to the voice assistant 102a to wake up the voice assistant 102a, and the disclosure is not limited thereto.

The cloud service platform 104a is connected to the voice assistant 102a via the network 110 and may be a network platform set up by the manufacturer of the voice assistant 102a to manage the voice assistant 102a. For example, if the voice assistant 102a is Amazon Echo, the corresponding cloud service platform 104a may be Amazon Web Service (AWS). For another example, if the voice assistant 102a is Google Assistant, the corresponding cloud service platform 104a may be the Google cloud server or the Google service platform.

In different embodiments, the cloud service platform 104a may store/record skill applications corresponding to the voice assistant 102a. The skill applications may be produced by manufacturers of applications (e.g., a projector manufacturer) and installed on the cloud service platform 104a.

In an embodiment, the user may say the voice signal AS1 to the voice assistant 102a. The voice signal AS1 includes an invocation name corresponding to the skill application to be used and an intent, and the ordering thereof is not specifically limited. When the voice assistant 102a receives the voice signal including the invocation name and the intent, the voice assistant 102a may extract/acquire keywords (including the above invocation name, intent, etc.) from the voice signal and transmit the keywords to the cloud service platform 104a. Next, the cloud service platform 104a finds the corresponding skill application according to the above invocation name and correspondingly controls the voice assistant 102a to perform the corresponding operation (e.g., answering a question raised by the user etc., but is not limited thereto) according to the intent said/input by the user. For example, the user says the voice signal for powering on a Company A projector, and "Company A projector" represents the invocation name corresponding to the skill application to be used, and "powering on" represents the intent. When the voice assistant 102a receives the voice signal for powering on the Company A projector, the voice assistant 102a transmits the voice signal to the cloud service platform 104a. Next, the cloud service platform 104a finds the skill application provided by Company A according to the above invocation name. The cloud service platform 104a provides a first response signal R1 to the voice assistant 102a and controls the voice assistant 102a to answer a response voice signal RS1 "Powering on Company A projector.".

The management server 108 is connected to the cloud service platform 104a and the projector 106a and is configured to manage and control the projector 106a. In an embodiment, the management server 108 may be set up and maintained by the manufacturer of the projector 106a and may be configured to correspondingly control the projector 106a according to the control command from the cloud service platform 104. In addition, the disclosure is not limited to the case that the management server 108 and the cloud service platform 104a are provided in different servers. In other embodiments, the cloud service platform 104a and the management server 108 may be provided in the same server. In other words, the cloud service platform 104a may be connected to the management server 108 by being located in the same server.

In an embodiment, a specific skill application for controlling the projector 106a may be installed on the cloud service platform 104a to allow the user to control the operating state of the projector 106a through the voice assistant 102a. In this case, after the user says the invocation name of the specific skill application and the intent to the voice assistant 102a, the cloud service platform 104a may then forward the user's intent to the management server 108 managing the projector 106a based on the invocation name, so as to have the management server 108 correspondingly adjust the operating state of the projector 106a. The relevant operation details will be further described with reference to FIG. 2.

Figure 2:
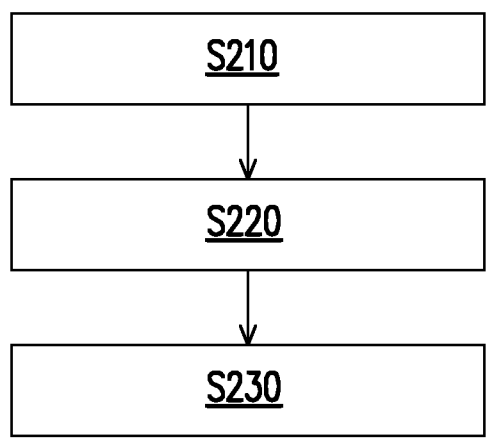
FIG. 2 is a flowchart illustrating a method for controlling a projector according to an embodiment of the disclosure.

Referring to FIG. 2, FIG. 2 is a flowchart illustrating a method for controlling a projector according to an embodiment of the disclosure. The method shown in FIG. 2 may be performed in coordination with the intelligent voice system 100 of FIG. 1, and the details of the steps of FIG. 2 will be described below with reference to the devices shown in FIG. 1.

First, in step S210, when the voice assistant 102a receives a voice signal AS1 for controlling the projector 106a, the voice assistant 102a may extract/acquire a plurality of first keywords from the voice signal AS1 and transmit the first keywords to the cloud service platform 104a.

In an embodiment, the first keywords may include a first alias AL1 corresponding to the projector 106a and a first control command CMD1. In different embodiments, the user registers on the website page corresponding to the management server 108 of the projector manufacturer. In other words, the projector 106a has been registered on the management server 108 in advance based on the first alias AL1 and the unique identification information (e.g., a serial number) of the projector 106a. Moreover, the first alias AL1 of the projector 106a may be selected from a plurality of predetermined aliases (e.g., living room, bedroom, etc.) provided by the management server 108 in the registration process of the projector 106a. In addition, the first control command CMD1 may correspond to the user's intent, i.e., the control operation (e.g., powering on, powering off, increasing/decreasing brightness, increasing/decreasing contrast ratio, starting on screen display (OSD), etc.) to be performed on the projector 106a. The starting on screen display (OSD) means that turning on the menu of OSD function for adjusting current status of projector.

In the present embodiment, the cloud service platform 104a may include a first semantic analyzing program and a plurality of second control commands CMD2. Each of the second control commands CMD2 is, for example, a control command (e.g., powering on, powering off, increasing/decreasing brightness, increasing/decreasing contrast ratio, starting OSD, etc.) pre-established by the manufacturer of the projector 106a.

In an embodiment, the first semantic analyzing program may include a first lookup table, and each of the second control commands CMD2 may be recorded in the first lookup table for searching, but the disclosure is not limited thereto. In another embodiment, the first semantic analyzing program may include information on each of the second control commands CMD2. In another embodiment, the first lookup table recording each of the second control commands CMD2 may also be stored in a database (not shown) in the cloud service platform 104a. In other embodiments, each of the second control commands CMD2 may also be generated through artificial intelligence or machine learning. For example, the cloud service platform 104a may perform deep learning based on the history of the voice input of the user to learn the user's habitual words and grammar and further establish the plurality of second control commands CMD2, but the disclosure is not limited thereto.

Therefore, in step S220, the cloud service platform 104a may analyze the first control command CMD1 according to the first semantic analyzing program, acquire/retrieve or generate the corresponding second control command CMD2 according to the first control command CMD1, and transmit the first alias AL1 of the projector 106a and the corresponding second control command CMD2 to the management server 108. It is noted that the cloud service platform 104a is configured to convert the first control command CMD1, which is originally a voice signal, into a text file for comparing with the second control commands CMD2 in the cloud service platform 104a. In an embodiment, the second control command CMD2 may be a text file but is not limited thereto.

For example, if the first control command CMD1 input by the user is "power on", in the case that the second control command CMD2 corresponding to "power on" is stored on the cloud service platform 104a, the cloud service platform 104a may accordingly retrieve the second control command CMD2 corresponding to "power on". Next, the cloud service platform 104a may transmit the first alias AL1 of the projector 106a and the second control command CMD2 corresponding to "power on" to the management server 108. For another example, if the first control command CMD1 input by the user is "increase brightness", in the case that the second control command CMD2 corresponding to "increase brightness" is stored on the cloud service platform 104a, the cloud service platform 104a may accordingly retrieve the second control command CMD2 corresponding to "increase brightness". Next, the cloud service platform 104a may transmit the first alias AL1 of the projector 106a and the second control command CMD2 corresponding to "increase brightness" to the management server 108.

In other embodiments, if the second control command CMD2 corresponding to the first control command CMD1 (e.g., turning on the light) input by the user is not present on the cloud service platform 104a, the cloud service platform 104a may control the voice assistant 102a to output/reply a response sentence of recognition failure (e.g., "Sorry, I don't know what you mean."), but the disclosure is not limited thereto.

Next, in step S230, the management server 108 may access/control the projector 106a (it means that the management server 108 reads information of the projector 106a to control the projector 106a) in response to the first alias AL1 and adjust the projector 106a as a first operating state (e.g., powering on, powering off, increasing/decreasing brightness, increasing/decreasing contrast ratio, starting OSD, etc.) according to the corresponding second control command CMD2.

In an embodiment, the management server 108 may generate a corresponding third control command CMD3 according to the second control command CMD2 and transmit the third control command CMD3 to the controller 106a1 of the projector 106a.

Correspondingly, the controller 106a1 of the projector 106a may receive the third control command CMD3 and adjust the first operating state of the projector 106a according to the third control command CMD3. The controller 106a1 includes, for example, a central processing unit (CPU), or another programmable microprocessor, digital signal processor (DSP), programmable controller, application specific integrated circuit (ASIC), programmable logic device (PLD) for general or specific purposes, another similar device, or a combination of these devices. In an embodiment, the controller 106a1 may include a first program (not shown). After receiving the third control command CMD3, the controller 106a1 may acquire a fourth control command CMD4 according to the first program and adjust the first operating state of the projector 106a accordingly. In the present embodiment, the fourth control command CMD4 may include a digital signal that may be configured to specifically adjust the hardware operating state of the projector 106a in response to the third control command CMD3 to implement the above first operating state. For example, when the third control command CMD3 is "increase brightness", the controller 106a1 may execute the first program to generate a digital signal for increasing the driving current of the light source and/or increasing the rotational speed of the fan, and use the digital signal as the fourth control command CMD4, wherein the fourth control command CMD4 is provided by the controller 106a1 to the light source device 106a2, but the disclosure is not limited thereto.

In another embodiment, the first program of the projector 106a may include a second lookup table. The second lookup table may include pre-established fifth control commands CMD4, and the fifth control commands are identical to the third control commands CMD3. In other words, the first program of the projector 106a may record the correspondence between each of the fifth control commands and the fourth control commands CMD4 in the second lookup table. In this case, when the controller 106a1 receives the third control command CMD3, the controller 106a1 may directly find the fifth control command identical to the third control command CMD3 and the corresponding fourth control command CMD4 from the second lookup table to further adjust the hardware operating state of the projector 106a to implement the above first operating state. For example, the second lookup table may record a fifth control command "increase brightness" and a fourth control command CMD4 "generate a digital signal for increasing driving current of light source and/or increasing rotational speed of fan" that correspond to each other. Therefore, when the third control command CMD3 is "increase brightness", the controller 106a1 may look up in the second lookup table and find the fifth control command "increase brightness", which is identical to the third control command CMD3 to further acquire the fourth control command CMD4 (i.e., "generate a digital signal for increasing driving current of light source and/or increasing rotational speed of fan") corresponding to the fifth control command. Then, the projector 106a can adjust the hardware operating state of the projector 106a according to the fourth control command CMD4 to implement the above first operating state, but the disclosure is not limited thereto.

Moreover, in an embodiment, the projector 106a may include electronic components such as a fan, a light source driver, a speaker, etc., and the third control command CMD3 may include information of the above electronic components and signals for controlling the above electronic components. The information of the above electronic components includes, for example, an identification code, and the signal for controlling the above electronic components includes, for example, a voltage or a current. Thereby, the projector 106a can specifically adjust the operating state of the relevant electronic components (e.g., increasing the rotational speed of a fan and/or increasing the voltage or current of a light source driver) in response to the third control command CMD3, but the disclosure is not limited thereto.

According to the above, the method for controlling a projector provided in the disclosure allows the user to control the operating state of the projector 106a by saying the voice signal AS1 to the voice assistant 102a, which thereby provides a novel, intuitive, and convenient projector control system.

In an embodiment, when the management server 108 accesses/controls the projector 106a, the projector 106a provides a second response signal to the management server 108. In other words, the projector 106a can correspondingly feed back the operating state of the projector 106a and the current information of each component (e.g., duration of use of the light source, relevant parameter data of the projector set by the user, etc.) to the management server 108.

In an embodiment, after the projector 106a is adjusted as the first operating state, the projector 106a may further report the first operating state to the management server 108. Then, the management server 108 may forward the first operating state to the cloud service platform 104a. Correspondingly, the cloud service platform 104a generates a first response sentence according to the first operating state and sends the first response sentence to the voice assistant 102a to have the voice assistant 102a output the first response sentence. For example, if the projector 106a is adjusted as the power-on state, the first response sentence output by the voice assistant 102a may be "The projector is powered on.", etc. For another example, if the projector 106a is adjusted as the power-off state, the first response sentence output by the voice assistant 102a may be "The projector is powered off", etc., but the disclosure is not limited thereto.

In other embodiments, the method for controlling a projector provided in the disclosure may further allow the user to control the same one projector through different voice assistants, which will be described below.

Figure 3:
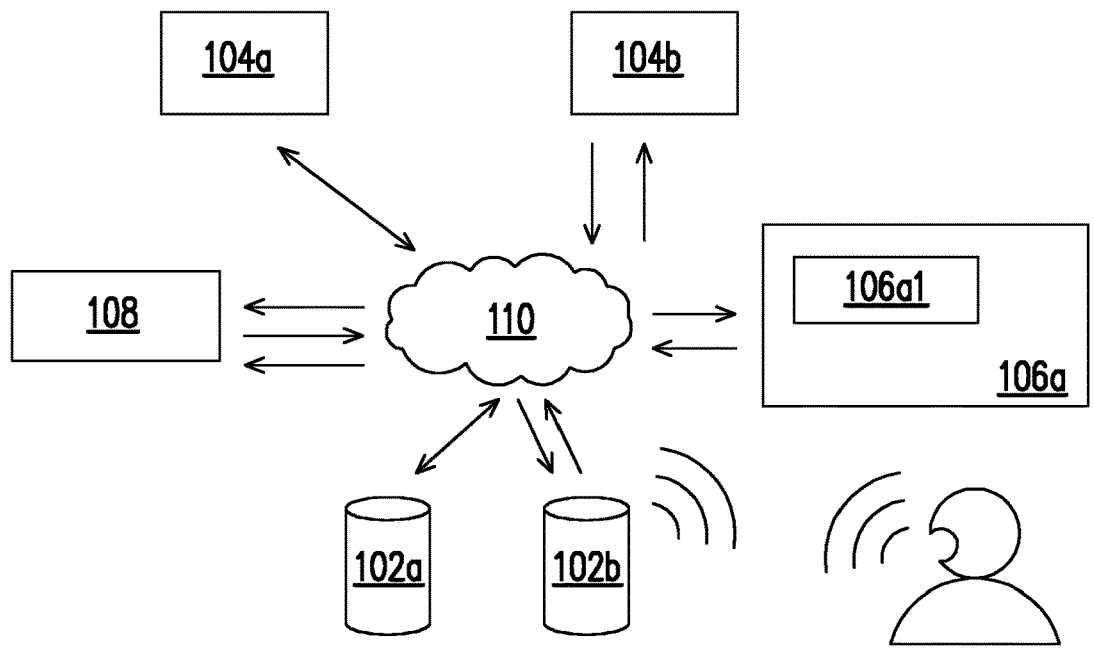
FIG. 3 is a schematic diagram illustrating an intelligent voice system according to FIG. 1.

Referring to FIG. 3, FIG. 3 is a schematic diagram illustrating an intelligent voice system according to FIG. 1. As shown in FIG. 3, an intelligent voice system 300 of the present embodiment includes voice assistants 102a and 102b, cloud service platforms 104a and 104b, a projector 106a, and a management server 108.

In the present embodiment, the voice assistants 102a and 102b may be manufactured respectively by different manufacturers and may be managed respectively by different cloud service platforms. For example, if the voice assistant 102a is Amazon Echo, the voice assistant 102b may be Google Assistant. Correspondingly, the voice assistants 102a and 102b may be respectively managed by the cloud service platforms 104a and 104b. The cloud service platform 104a may be, for example, AWS, and the cloud service platform 104b may be, for example, a Google cloud server, but the disclosure is not limited thereto.

In the present embodiment, in addition to controlling the projector 106a by saying a voice signal to the voice assistant 102a, the user can also control the projector 106a by saying a voice signal to the voice assistant 102b.

Specifically, when the voice assistant 102b receives a second voice signal AS2 for controlling the projector 106a, the voice assistant 102b may extract a plurality of second keywords from the second voice signal AS2 and transmit the second keywords to the cloud service platform 104b. The second keywords include the first alias AL1 corresponding to the projector 106a and a sixth control command CMD6.

Similar to the cloud service platform 104a, the cloud service platform 104b includes a second semantic analyzing program and a plurality of seventh control commands CMD7. Each of the seventh control commands CMD7 is, for example, a control command (e.g., powering on, powering off, increasing/decreasing brightness, increasing/decreasing contrast ratio, starting OSD, etc.) pre-established by the manufacturer of the projector 106a.

Moreover, in the present embodiment, the cloud service platform 104b may analyze the sixth control command CMD6 according to the second semantic analyzing program, acquire the corresponding seventh control command CMD7 according to the sixth control command CMD6, and transmit the first alias AL1 of the projector 106a and the seventh control command CMD7 corresponding to the sixth control command CMD6 to the management server 108. Next, the management server 108 may access the projector 106a in response to the first alias AL1 and adjust the projector 106a as a second operating state according to the seventh control command CMD7 corresponding to the sixth control command CMD6.

Details of relevant operations above performed in coordination by the voice assistant 102b, the cloud service platform 104b, and the management server 108 to complete the control on the projector 106a are largely identical to those of the operations performed in coordination by the voice assistant 102a, the cloud service platform 104a, and the management server 108 as taught above. Moreover, the roles of the second semantic analyzing program, the sixth control command CMD6, and the seventh control command CMD7 above are also similar to those of the first semantic analyzing program, the first control command CMD1, and the second control command CMD2 as taught above. Therefore, reference may be made to the description in the previous embodiment for details thereof, which shall not be repeatedly described herein.

In an embodiment, when the voice assistants 102a and 102b are located close to each other, the voice signal AS1 or AS2 said by the user may be received by the voice assistants 102a and 102b at the same time.

In an embodiment, since the wake-up word that can be received by the voice assistant 102a is different from the wake-up word that can be received by the voice assistant 102b, the operations performed by the voice assistants 102a and 102b will also vary depending on the different wake-up words. In other words, only one single voice assistant can be woken up.

In different embodiments, the language that the voice assistant 102a can process may be the same as or different from the language that the voice assistant 102b can process (i.e., the language of the voice signal AS1 may be the same as or different from the language of the voice signal AS2), and the operations performed by the voice assistants 102a and 102b will also vary depending on whether the language is the same or different.

For example, assuming that the language (e.g., English) of the voice signal AS1 is different from the language (e.g., Japanese) of the voice signal AS2, when the voice assistant 102a receives the voice signal AS2 and the first semantic analyzing program cannot recognize the voice signal AS2, the voice assistant 102a may output a response sentence of recognition failure. Similarly, when the voice assistant 102b receives the voice signal AS1 and the second semantic analyzing program cannot recognize the voice signal AS1, the voice assistant 102b may also output a response sentence of recognition failure.

Conversely, if the language of the voice signal AS1 is the same as the language of the voice signal AS2 (e.g., both being Japanese), the intelligent voice system 300 can perform other operations to control the projector 106a, the details of which will be described with reference to FIG. 4.

Figure 4:
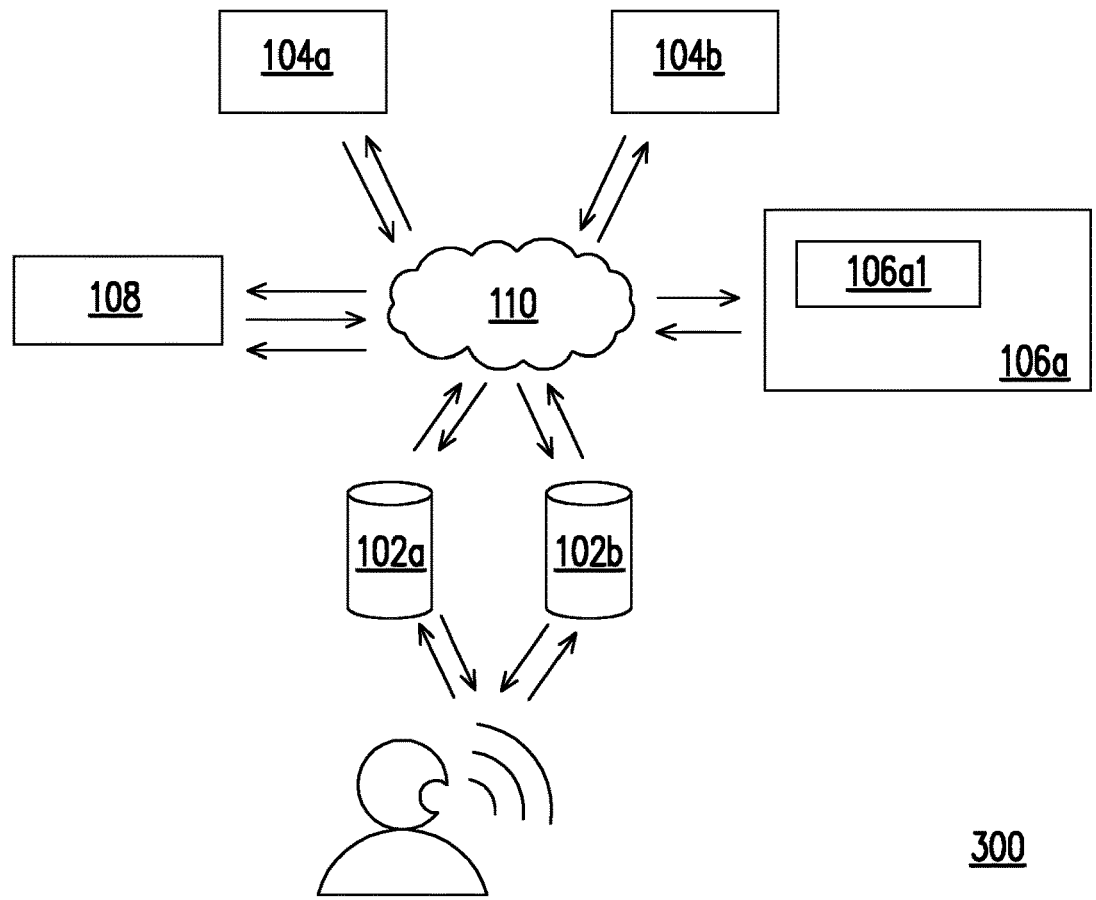
FIG. 4 is a schematic diagram illustrating an intelligent voice system according to FIG. 3.

Referring to FIG. 4, FIG. 4 is a schematic diagram illustrating an intelligent voice system according to FIG. 3. In the present embodiment, when the voice assistant 102a also receives the voice signal AS2 for controlling the projector 106a, the voice assistant 102a may extract the second keywords from the voice signal AS2 and transmit the second keywords to the cloud service platform 104a. The second keywords include the first alias AL1 corresponding to the projector 106a and the sixth control command CMD6.

Next, the cloud service platform 104a may analyze the sixth control command CMD6 according to the first semantic analyzing program and acquire an eighth control command CMD8 according to the sixth control command CMD6, wherein the eighth control command CMD8 is one of the above second control commands CMD2. Moreover, the cloud service platform 104a may transmit the first alias AL1 of the projector 106a and the eighth control command CMD8 to the management server 108. Next, the management server 108 may access the projector 106a in response to the first alias AL1 and adjust the projector 106a again as the second operating state according to the eighth control command CMD8 corresponding to the sixth control command CMD6.

In brief, when the language that the voice assistants 102a and 102b can process is the same and the same one voice signal is received, the voice assistants 102a and 102b will respectively implement repetitive control on the projector 106a (e.g., consecutively performing power-on twice or consecutively increasing the brightness twice) through the corresponding cloud service platforms 104a and 104b.

In other embodiments, the method for controlling a projector provided in the disclosure may further allow the user to control different projectors through one single voice assistant, which will be described below.

Figure 5:
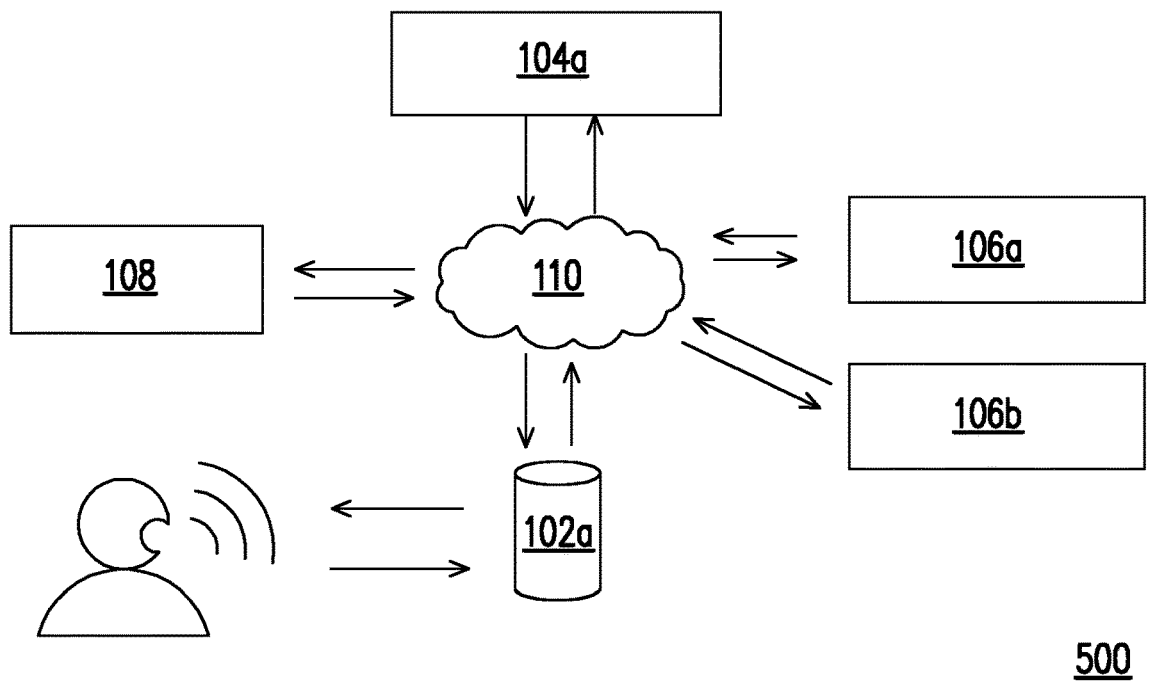
FIG. 5 is a schematic diagram illustrating an intelligent voice system according to FIG. 1.

Referring to FIG. 5, FIG. 5 is a schematic diagram illustrating an intelligent voice system according to FIG. 1. As shown in FIG. 5, an intelligent voice system 500 of the present embodiment includes a voice assistant 102a, a cloud service platform 104a, projectors 106a and 106b, and a management server 108.

In the present embodiment, the projectors 106a and 106b may be manufactured by the same manufacturer. Moreover, similar to the projector 106a, the projector 106b may also be registered on the management server 108 in advance based on a second alias AL2 and the unique identification information (e.g., a serial number) of the projector 106b. In addition, the second alias AL2 of the projector 106b may be selected from a plurality of predetermined aliases (e.g., living room, bedroom, etc.) provided by the management server 108 in the registration process of the projector 106b.

In the present embodiment, in addition to controlling the projector 106a by saying a voice signal to the voice assistant 102a, the user can also control the projector 106b by saying a voice signal to the voice assistant 102a.

Specifically, when the voice assistant 102a receives a voice signal AS3 for controlling the projector 106b, the voice assistant 102a may extract a plurality of third keywords from the voice signal AS3 and transmit the third keywords to the cloud service platform 104a. The third keywords include the second alias AL2 corresponding to the projector 106b and a ninth control command CMD9.

Next, the cloud service platform 104a may analyze the ninth control command CMD9 according to the first semantic analyzing program to acquire a tenth control command CMD10, wherein the tenth control command CMD10 is one of the above second control commands CMD2.

Moreover, the cloud service platform 104a may transmit the second alias AL2 of the projector 106b and the tenth control command CMD10 corresponding to the ninth control command CMD9 to the management server 108. Next, the management server 108 may access the projector 106b in response to the second alias AL2 and adjust the projector 106b as a third operating state according to the tenth control command CMD10 corresponding to the ninth control command CMD9.

Details of relevant operations above performed in coordination by the voice assistant 102a, the cloud service platform 104a, and the management server 108 to complete the control on the projector 106b are largely identical to those of the operations performed in coordination by the voice assistant 102a, the cloud service platform 104a, and the management server 108 to complete the control on the projector 106a as taught above. Moreover, the roles of the ninth control command CMD9 and the tenth control command CMD10 above are also similar to those of the first control command CMD1 and the second control command CMD2 as taught above. Therefore, reference may be made to the description in the previous embodiment for details thereof, which shall not be repeatedly described herein.

Figure 6:
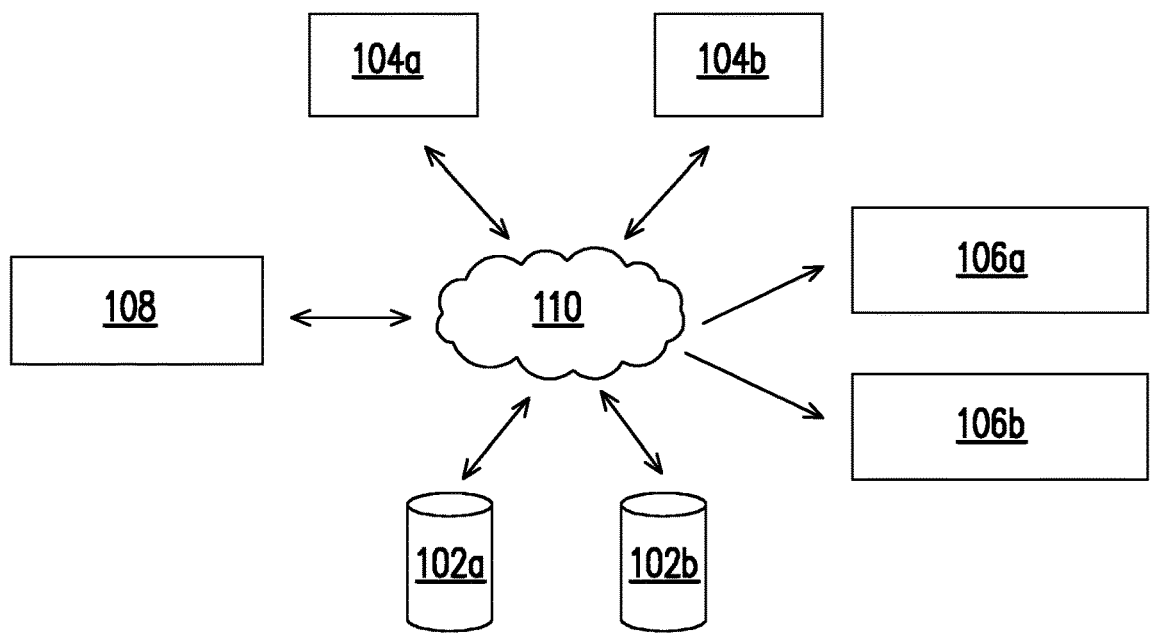
FIG. 6 is a schematic diagram illustrating an intelligent voice system according to FIG. 1, FIG. 3, FIG. 4, and FIG. 5.

Referring to FIG. 6, FIG. 6 is a schematic diagram illustrating an intelligent voice system according to FIG. 1, FIG. 3, FIG. 4, and FIG. 5. As shown in FIG. 6, an intelligent voice system 600 includes voice assistants 102a and 102b, cloud service platforms 104a and 104b, projectors 106a and 106b, and a management server 108. The intelligent voice system 600 of the present embodiment may be regarded as a combination of the intelligent voice systems 100, 300, and 500 as taught above. In other words, when the user would like to control the projector 106a and/or 106b, the user may have the voice assistant 102a and/or 102b operate in coordination with the corresponding cloud service platform 104a and/or 104b and the management server 108 by saying a voice signal to the voice assistant 102a and/or 102b, so as to realize relevant control on the projector 106a and/or 106b. Reference may be made to the description in the previous embodiment for relevant details, which shall not be repeatedly described herein.

Figure 7A:
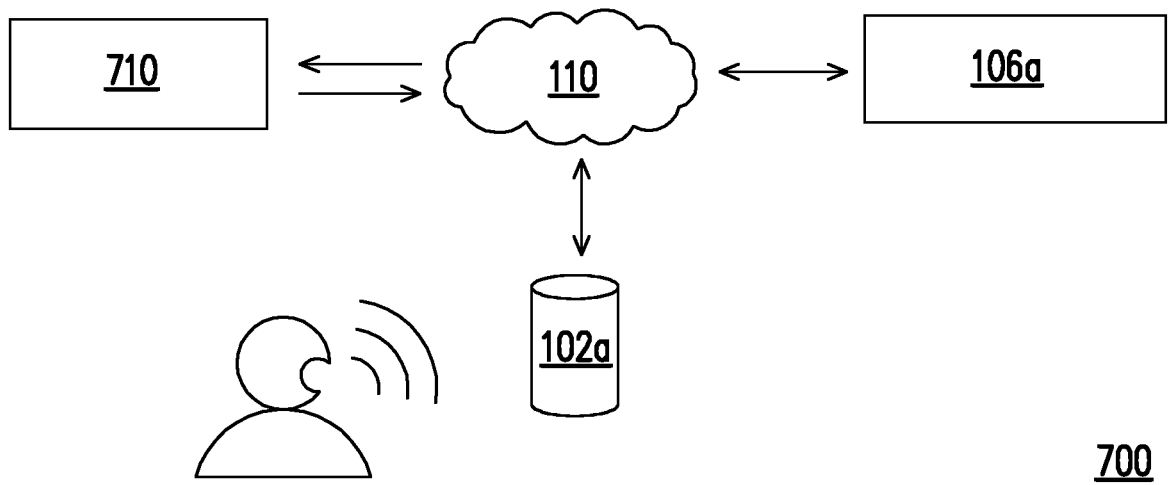
FIG. 7A is a schematic diagram illustrating an intelligent voice system according to FIG. 1.

Referring to FIG. 7A, FIG. 7A is a schematic diagram illustrating an intelligent voice system according to FIG. 1. As shown in FIG. 7A, an intelligent voice system 700 includes a voice assistant 102a, a cloud service server 710, and a projector 106a. The cloud service server 710 may be connected to the voice assistant 102a and the projector 106a and is configured to manage and control the voice assistant 102a and the projector 106a. In the present embodiment, the cloud service server 710 may be regarded as a combination of the cloud service platform 104a and the management server 108 of FIG. 1 and can thus integrally perform the operations originally respectively performed by the cloud service platform 104a and the management server 108 of FIG. 1.

For example, when the voice assistant 102a receives a voice signal AS1 for controlling the projector 106a, the voice assistant 102a extracts a plurality of first keywords from the voice signal AS1 and transmits the first keywords to the cloud service server 710. As in relevant description of FIG. 1, the first keywords may include the first alias AL1 corresponding to the projector 106a and the first control command CMD1.

Moreover, the cloud service server 710 may include the first semantic analyzing program and the plurality of second control commands CMD2 included in the cloud service platform 104a of FIG. 1. Similar to the cloud service platform 104a, the cloud service server 710 may analyze the first control command CMD1 according to the first semantic analyzing program and acquire, retrieve, or generate the corresponding second control command CMD2 according to the first control command CMD1.

Next, similar to the management server 108, the cloud service server 710 may access the projector 106a in response to the first alias AL1 and adjust the projector 106a as the first operating state according to the second control command CMD2 corresponding to the first control command CMD1. Reference may be made to the description of the previous embodiment for relevant operation details of the present embodiment, which shall not be repeatedly described herein.

Figure 7B:
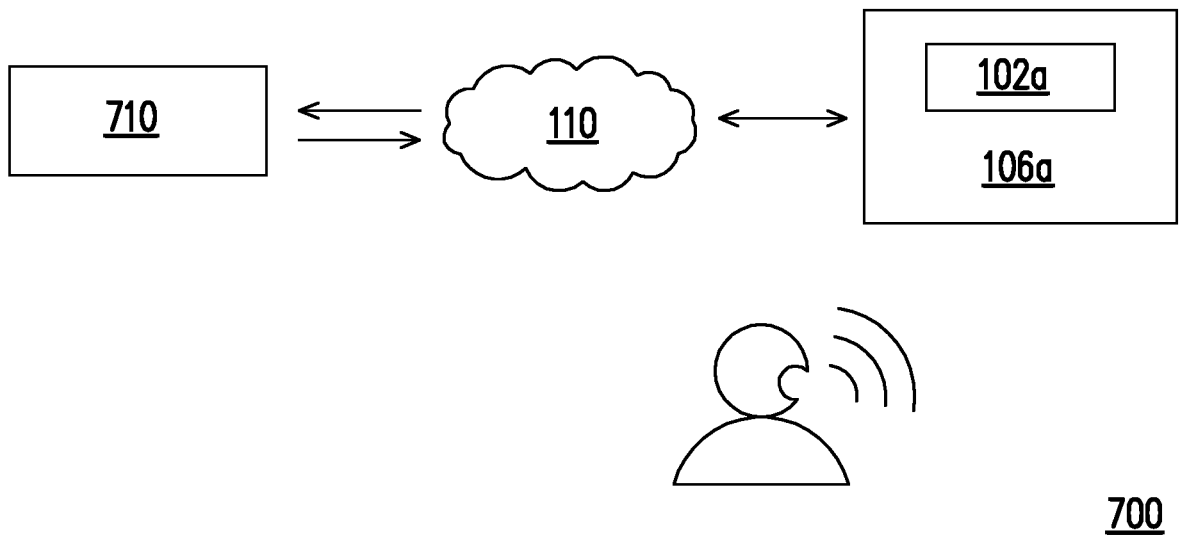
FIG. 7B is a schematic diagram illustrating another intelligent voice system according to FIG. 1.

Referring to FIG. 7B, FIG. 7B is a schematic diagram illustrating another intelligent voice system according to FIG. 1. The intelligent voice system of FIG. 7B is highly consistent with the intelligent voice system of FIG. 7A. As shown in FIG. 7B, an intelligent voice system 700 includes a cloud service server 710 and a projector 106a. The cloud service server 710 may be connected to the projector 106a and is configured to manage and control a voice assistant 102a and the projector 106a. In the present embodiment, the cloud service server 710 may be regarded as a combination of the cloud service platform 104a and the management server 108 of FIG. 1 and can thus integrally perform the operations originally respectively performed by the cloud service platform 104a and the management server 108 of FIG. 1. The voice assistant 102a is integrated into the projector 106a and the projector 106a can thus integrally perform the operations originally respectively performed by the voice assistant 102a and the projector 106a of FIG. 1.

For example, when the voice assistant 102a of the projector 106a receives a voice signal AS1 for controlling the projector 106a, the voice assistant 102a extracts a plurality of first keywords from the voice signal AS1 and transmits the first keywords to the cloud service server 710. As in relevant description of FIG. 1, the first keywords may include the first alias AL1 corresponding to the projector 106a and the first control command CMD1.

Moreover, the cloud service server 710 may include the first semantic analyzing program and the plurality of second control commands CMD2 included in the cloud service platform 104a of FIG. 1. Similar to the cloud service platform 104a, the cloud service server 710 may analyze the first control command CMD1 according to the first semantic analyzing program and acquire, retrieve, or generate the corresponding second control command CMD2 according to the first control command CMD1.

Next, similar to the management server 108, the cloud service server 710 may access the projector 106a in response to the first alias AL1 and adjust the projector 106a as the first operating state according to the second control command CMD2 corresponding to the first control command CMD1. Reference may be made to the description of the previous embodiment for relevant operation details of the present embodiment, which shall not be repeatedly described herein.

According to the above, the intelligent voice system and the method for controlling a projector provided in the disclosure allow the user to achieve the purpose of controlling the projector by saying a voice signal to the voice assistant. Moreover, with respect to voice assistants manufactured by different manufacturers, the disclosure also provides corresponding systems to enable the user to control one or more projectors manufactured by the same manufacturer through the voice assistants. Thereby, the disclosure provides the user with a novel, intuitive, and convenient projector control system.

In other embodiments, the disclosure further allows the user to control the projector to project a video platform interface through the voice assistant, which will be further described below.

First, the user may first control the projector 106a to project a video platform interface (e.g., the Youtube™ interface) based on the teaching of FIG. 1. Specifically, assuming that the voice signal AS1 in FIG. 1 is used to control the projector 106a to project a video platform interface, the voice assistant 102a may extract a plurality of keywords from the voice signal AS1 and forward the keywords to the cloud service platform 104a. The keywords may include the first alias AL1 of the projector 106a and the first control command CMD1 (e.g., "turn on the video platform interface").

Then, the cloud service platform 104a may analyze the first control command CMD1 according to the first semantic analyzing program and find the corresponding second control command CMD2 according to the first control command CMD1. Next, the cloud service platform 104a may forward the first alias AL1 of the projector 106a and the second control command CMD2 corresponding to the first control command CMD1 to the management server 108. Correspondingly, the management server 108 may access/control the projector 106a in response to the first alias AL1 and turn on a first application of the projector 106a according to the second control command CMD2.

In the present embodiment, the first application may be stored in a storage device (e.g., a memory, a flash memory, etc.) (not shown) of the projector 106a. When the above first application (e.g., an application that can execute Youtube™) is turned on, the projector 106a can be correspondingly connected to a first website (e.g., the Youtube™ website) that provides the above video platform interface. Moreover, after the projector 106a receives the video signal from the first website, the projector 106a may correspondingly project the video platform interface onto a projection surface. The projection surface is, for example, a screen or a wall. In different embodiments, the projector 106a may be provided with a wireless network medium and/or a wired network medium (e.g., a network card or a relevant dongle; it is not limited to transmission using Bluetooth, Wi-Fi, Zigbee, or another wireless transmission medium, and it is also not limited to transmission using optical fibers or another wired transmission interface) to receive the video signal.

After the projector 106a is controlled to project the above video platform interface, the disclosure further allows the user to control a projection situation of the video platform interface by the projector 106a through the voice assistant 102a, the details of which will be described below.

Figure 8:
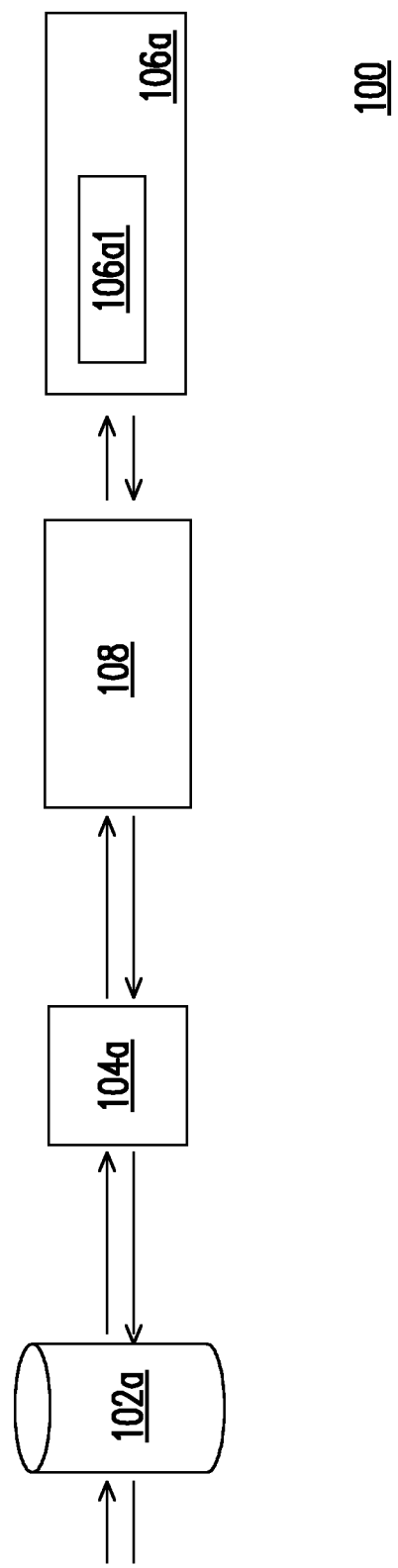
FIG. 8 is a schematic diagram illustrating control on a projection situation of a video platform interface by an intelligent voice system according to FIG. 1.
Figure 9:
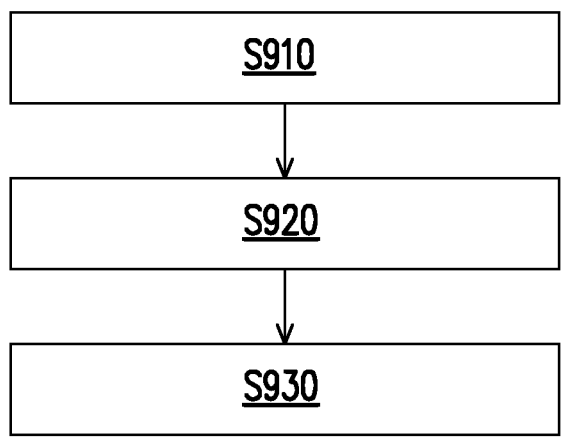
FIG. 9 is a flowchart illustrating a method for controlling a projector according to FIG. 8.

Referring to FIG. 8 and FIG. 9, FIG. 8 is a schematic diagram illustrating control on a projection situation of a video platform interface by an intelligent voice system according to FIG. 1, and FIG. 9 is a flowchart illustrating a method for controlling a projector according to FIG. 8. The method shown in FIG. 9 may be performed by the intelligent voice system 100 of FIG. 8, and the details of the steps of FIG. 9 will be described below with reference to the devices shown in FIG. 8.

First, in step S910, when the voice assistant 102a receives a voice signal AS1' for controlling a video platform interface, the voice assistant 102a extracts/acquires a plurality of keywords from the voice signal AS1' and forwards the keywords to the cloud service platform 104a. The keywords include the first alias AL1 corresponding to the projector 106a and a first interface control command ICMD1. The keywords may further include the name for waking up the video platform interface. In the present embodiment, the cloud service platform 104a further includes a plurality of second interface control commands ICMD2.

Then, in step S920, the cloud service platform 104a may analyze the first interface control command ICMD1 according to the first semantic analyzing program, acquire the corresponding second interface control command ICMD2 according to the first interface control command ICMD1, and transmit the first alias AL1 of the projector 106a and the second interface control command ICMD2 corresponding to the first interface control command ICMD1 to the management server 108.

Next, in step S930, the management server 108 may access/control the projector 106a in response to the first alias AL1 and adjust the projection situation of the video platform interface by the projector 106a. In the present embodiment, the controller 106a1 of the projector 106a may receive the second interface control command ICMD2 and generate a corresponding third interface control command ICMD3 for controlling the operation of the above first application to thereby achieve the effect of adjusting the projection situation of the video platform interface.

In different embodiments, the second interface control command ICMD2 and the corresponding third interface control command ICMD3 may be presented in different forms to allow the user to control the projection situation of the video platform interface according to the requirements.

To provide a further understanding of the concept of the disclosure, a number of specific examples will be further described below.

Figure 10:
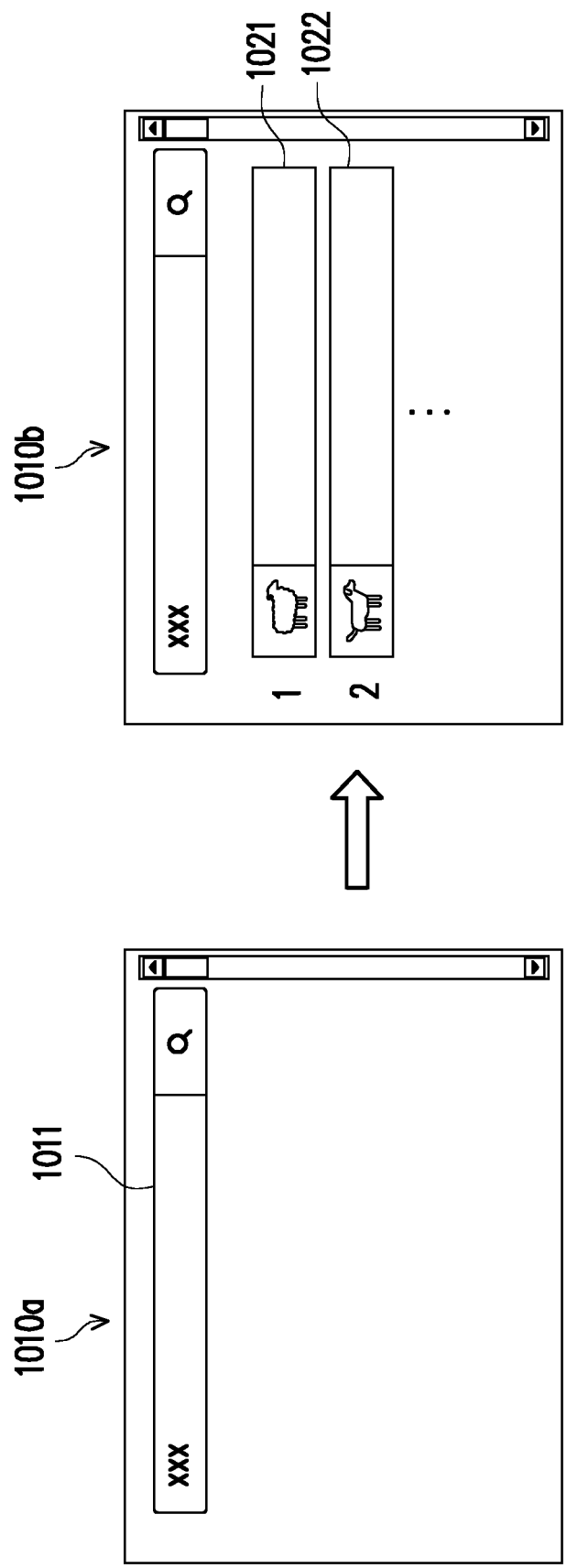
FIG. 10 is a schematic diagram illustrating performance of a search operation in a video platform interface according to FIG. 8 and FIG. 9.

Referring to FIG. 10, FIG. 10 is a schematic diagram illustrating performance of a search operation in a video platform interface according to FIG. 8 and FIG. 9. In the present embodiment, a video platform interface 1010a is, for example, a default image displayed after the projector 106a turns on the first application according to the second control command CMD2 and may include a search box 1011. Furthermore, the default image is an image of the video platform interface 1010a (e.g., the home page of the Youtube website).

In the present embodiment, when the video platform interface is turned on, the user may, for example, say a voice signal AS1' including keywords such as the first alias AL1 and "search xxx" (xxx may be a keyword of the video to be searched) to the voice assistant 102a. Correspondingly, the voice assistant 102a may use "search xxx" as the first interface control command ICMD1 and transmit it along with the first alias AL1 to the cloud service platform 104a. Next, the cloud service platform 104a may analyze the first interface control command ICMD1 to find the corresponding second interface control command ICMD2. In the present embodiment, the second interface control command ICMD2 may include a video search command "search" and a search keyword "xxx".

Next, the management server 108 may access the projector 106a according to the first alias AL1 and control the projection situation of the projector 106a according to the second interface control command ICMD2. Correspondingly, the first application of the projector 106a may perform a search in the first website according to the search keyword to find one or more video items 1021, 1022, etc. corresponding to the search keyword. Then, the projector 106a may correspondingly project a video platform interface 1010b, which includes the searched video items 1021 and 1022, as shown in FIG. 10. Thereby, the user can realize the search operation on the video platform interface through the voice assistant 102a.

Figure 11:
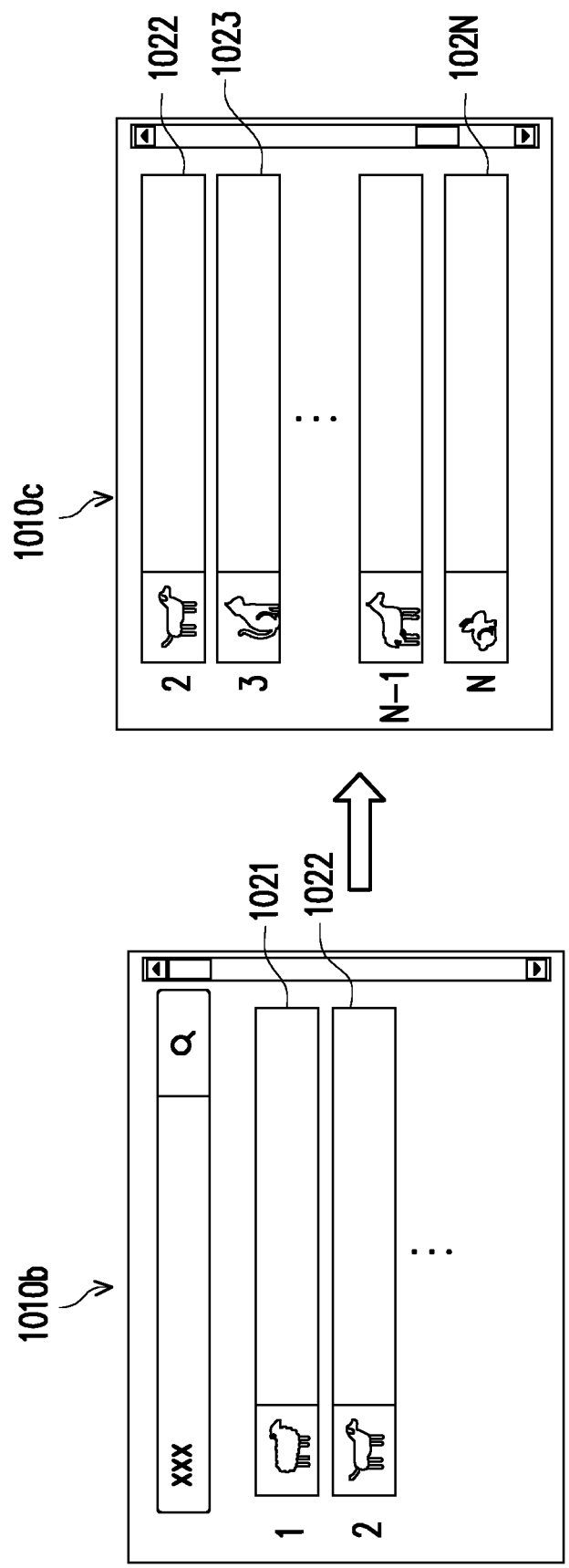
FIG. 11 is a schematic diagram illustrating performance of an interface scroll in a video platform interface according to FIG. 10.

Referring to FIG. 11, FIG. 11 is a schematic diagram illustrating performance of an interface scroll in a video platform interface according to FIG. 10. In the present embodiment, it is assumed that the projector 106a is currently projecting the video platform interface 1010b, which includes the video items 1021, 1022, etc.

In the present embodiment, the user may, for example, say a voice signal AS1' including keywords such as the first alias AL1 and "scroll down" to the voice assistant 102a. Correspondingly, the voice assistant 102a may use "scroll down" as the first interface control command ICMD1 and transmit it along with the first alias AL1 to the cloud service platform 104a. Next, the cloud service platform 104a may analyze the first interface control command ICMD1 to find the corresponding second interface control command ICMD2. In the present embodiment, the second interface control command ICMD2 may include an interface scroll command signal "scroll down".

Next, the management server 108 may access the projector 106a according to the first alias AL1 and control the projection situation of the projector 106a according to the second interface control command ICMD2. Correspondingly, the first application of the projector 106a may scroll the video platform interface 1010b according to the interface scroll command signal. Then, the projector 106a may correspondingly project the video platform interface 1010b that is being scrolled.

In an embodiment, the user may say a voice signal AS1' including keywords such as the first alias AL1 and "stop scrolling" to the voice assistant 102a while the video platform interface 1010b is being scrolled. Correspondingly, the voice assistant 102a may use "stop scrolling" as the first interface control command ICMD1 and transmit it along with the first alias AL1 to the cloud service platform 104a. Next, the cloud service platform 104a may analyze the first interface control command ICMD1 to find the corresponding second interface control command ICMD2. In the present embodiment, the second interface control command ICMD2 may include a stop scroll command signal "stop scrolling".

Next, the management server 108 may access the projector 106a according to the first alias AL1 and control the projection situation of the projector 106a according to the second interface control command ICMD2. Correspondingly, the first application of the projector 106a may stop scrolling the video platform interface 1010b according to the stop scroll command signal. Then, the projector 106a may correspondingly project a video platform interface 1010c (i.e., the video platform interface 1010b after the scroll stops), which includes searched video items 1022, 1023, . . . , 102N, as shown in FIG. 11. Thereby, the user can realize the interface scroll operation on the video platform interface through the voice assistant 102a.

Figure 12:
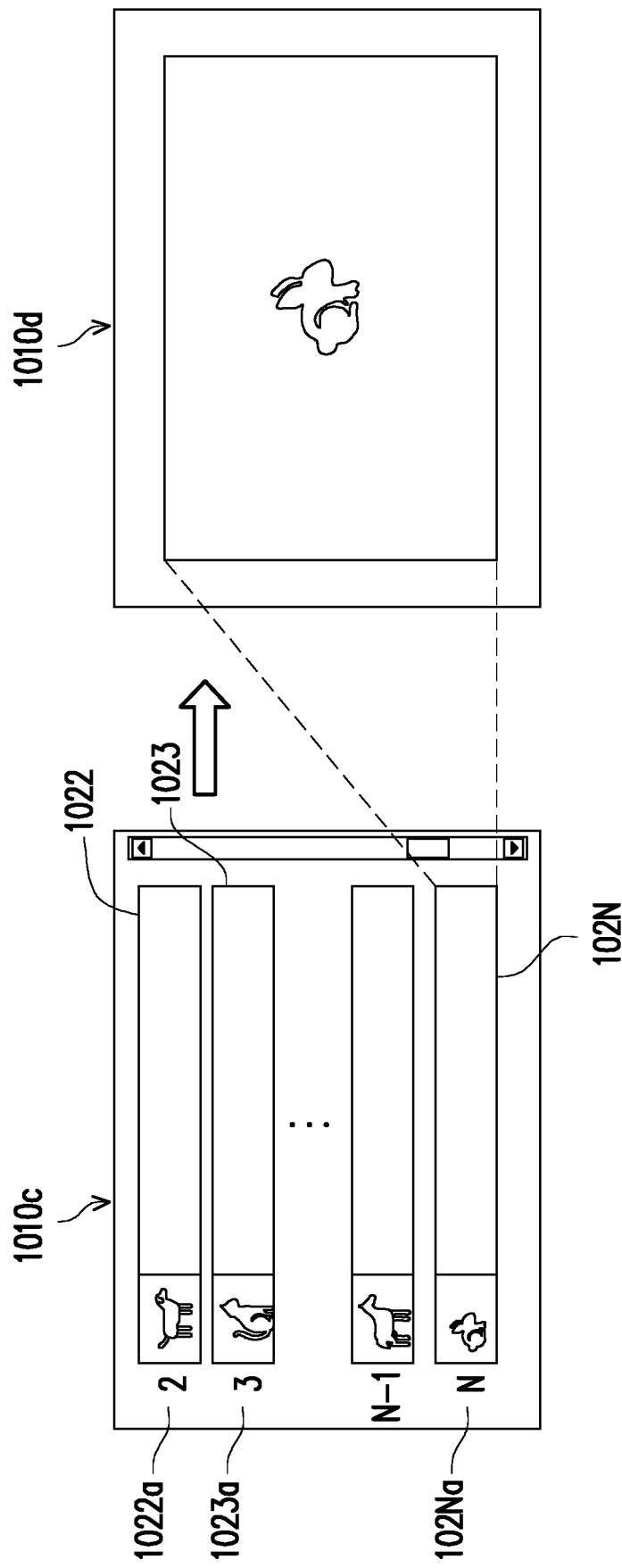
FIG. 12 is a schematic diagram illustrating performance of a playback operation in a video platform interface according to FIG. 11.

Referring to FIG. 12, FIG. 12 is a schematic diagram illustrating performance of a playback operation in a video platform interface according to FIG. 11. In the present embodiment, it is assumed that the projector 106a is currently projecting the video platform interface 1010c, which includes the video items 1022, 1023, . . . 102N, and the video items 1022 to 102N respectively have corresponding item labels 1022a, 1023a, . . . 102Na.

In the present embodiment, the user may, for example, say a voice signal AS1' including keywords such as the first alias AL1 and "play label oo" (the label oo may be an item label corresponding to the video item to be played) to the voice assistant 102a. For convenience of illustration, it is assumed below that the user would like to play the video item 102Na; namely, the user may say "play label N", but the disclosure is not limited thereto.

Correspondingly, the voice assistant 102a may use "play label N" as the first interface control command ICMD1 and transmit it along with the first alias AL1 to the cloud service platform 104a. Next, the cloud service platform 104a may analyze the first interface control command ICMD1 to find the corresponding second interface control command ICMD2. In the present embodiment, the second interface control command ICMD2 may include a play command "play" and a play label "label N".

Next, the management server 108 may access the projector 106a according to the first alias AL1 and control the projection situation of the projector 106a according to the second interface control command ICMD2. Correspondingly, the first application of the projector 106a may play the video item 102N corresponding to "label N" according to the play command and the play label. Then, the projector 106a may correspondingly project a video platform interface 1010d, which includes, for example, the video content of the video item 102N, as shown in FIG. 12. Thereby, the user can realize the playback operation on the video platform interface through the voice assistant 102a.

Figure 13:
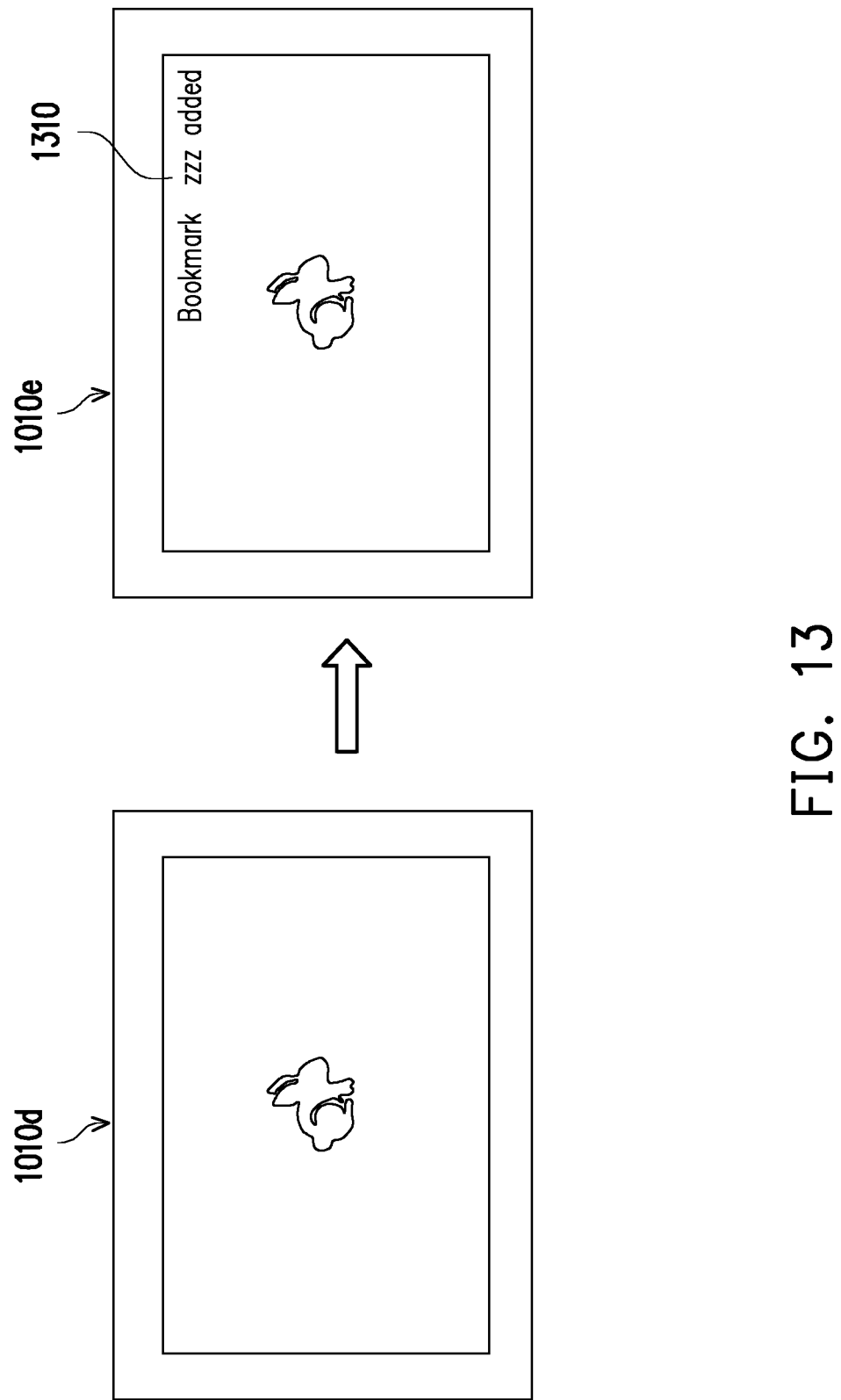
FIG. 13 is a schematic diagram illustrating performance of a bookmark adding operation in a video platform interface according to FIG. 12.

Referring to FIG. 13, FIG. 13 is a schematic diagram illustrating performance of a bookmark adding operation in a video platform interface according to FIG. 12. In the present embodiment, it is assumed that the projector 106a is currently projecting the video platform interface 1010d, which is, for example, the video content of the video item 102N.

In the present embodiment, the user may, for example, say a voice signal AS1' including keywords such as the first alias AL1 and "add bookmark zzz" (zzz may be a bookmark name set by the user according to the requirements) to the voice assistant 102a.

Correspondingly, the voice assistant 102a may use "add bookmark zzz" as the first interface control command ICMD1 and transmit it along with the first alias AL1 to the cloud service platform 104a. Next, the cloud service platform 104a may analyze the first interface control command ICMD1 to find the corresponding second interface control command ICMD2. In the present embodiment, the second interface control command ICMD2 may include a bookmark adding command "add bookmark" and a designated bookmark name "zzz".

Next, the management server 108 may access the projector 106a according to the first alias AL1 and control the projection situation of the projector 106a according to the second interface control command ICMD2. Correspondingly, the first application of the projector 106a may mark the video content of the video item 102N as the designated bookmark name (i.e., zzz) in the video platform interface 1010d according to the bookmark adding command and the designated bookmark name. Then, the projector 106a may correspondingly project a video platform interface 1010e, which displays, for example, a message 1310 of successful addition of the bookmark, as shown in FIG. 13. It is noted that the information of marking the video content of the video item 102N as the designated bookmark name (i.e., zzz) through the first application of the projector 106a will be stored in the server (not shown) of the video platform.

After the above bookmark adding operation is completed, the disclosure may allow the user to play the added bookmarks in an intuitive and simple manner, the details of which will be described below.

Figure 14:
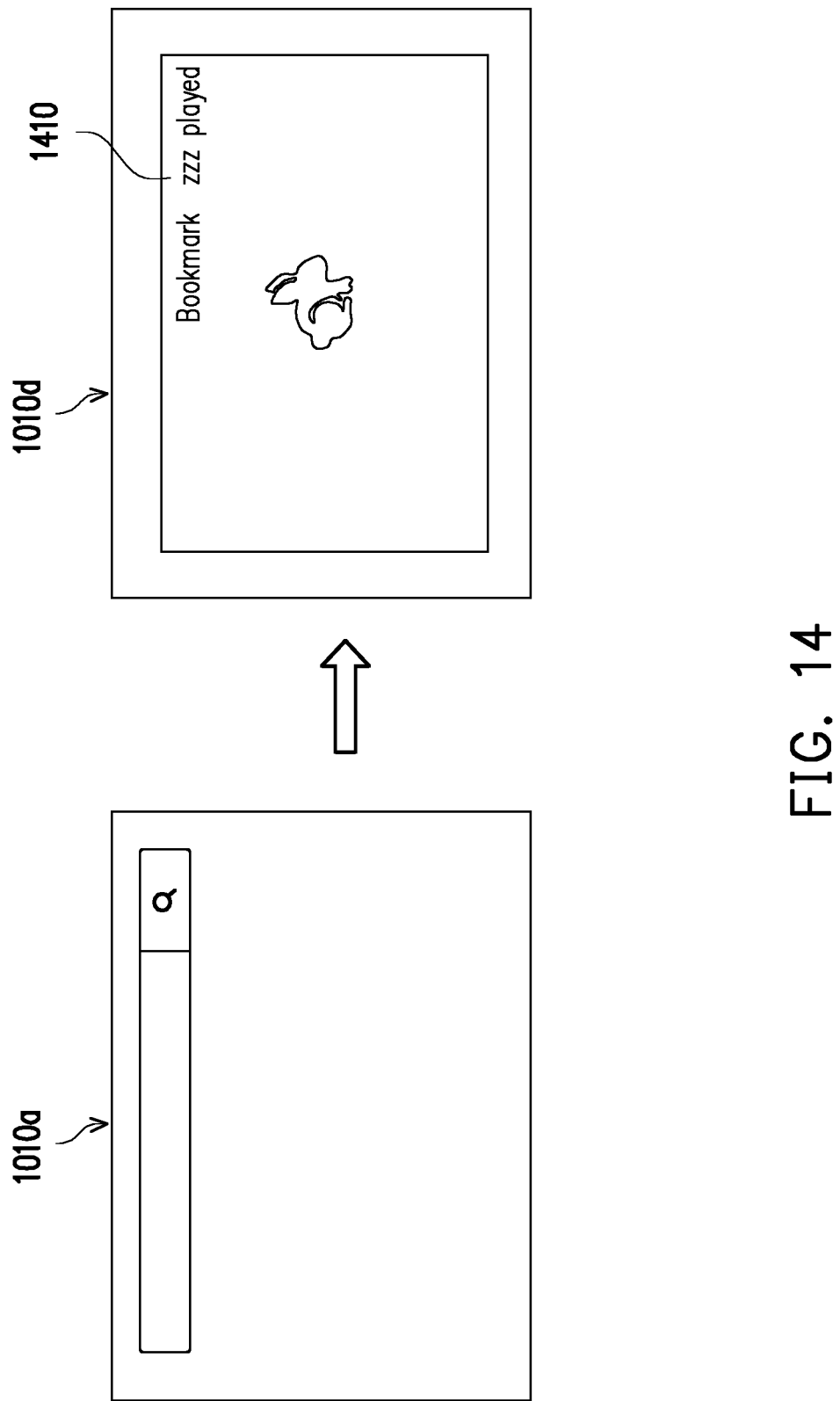
FIG. 14 is a schematic diagram illustrating performance of a bookmark adding operation in a video platform interface according to FIG. 13.

Referring to FIG. 14, FIG. 14 is a schematic diagram illustrating performance of a bookmark adding operation in a video platform interface according to FIG. 13. In the present embodiment, it is assumed that the projector 106a is currently projecting the video platform interface 1010a.

In the present embodiment, the user may, for example, say a voice signal AS1' including keywords such as the first alias AL1 and "play bookmark zzz" (zzz may be a bookmark previously added by the user, as shown in FIG. 13) to the voice assistant 102a.

Correspondingly, the voice assistant 102a may use "play bookmark zzz" as the first interface control command ICMD1 and transmit it along with the first alias AL1 to the cloud service platform 104a. Next, the cloud service platform 104a may analyze the first interface control command ICMD1 to find the corresponding second interface control command ICMD2. In the present embodiment, the second interface control command ICMD2 may include a bookmark play command "play bookmark" and a designated bookmark name "zzz".

Next, the management server 108 may access the projector 106a according to the first alias AL1 and control the projection situation of the projector 106a according to the second interface control command ICMD2. Correspondingly, according to the bookmark play command and the designated bookmark name, the first application of the projector 106a may provide the video content corresponding to the designated bookmark name stored in the server of the video platform to the projector 106a, and the projector 106a may play the video content corresponding to the designated bookmark name. As shown in FIG. 13, the projector 106a may correspondingly project the video platform interface 1010d, which, in addition to displaying the video content of the video item 102N, may further display a message 1410 of successful playback of the bookmark.

According to the above, the disclosure allows the user to realize the bookmark adding operation on the video platform interface through the voice assistant 102a. Moreover, the disclosure further allows the user to play a previously added bookmark by saying a voice signal, which thereby provides a novel, intuitive, and convenient operation method.

In summary of the above, the intelligent voice system and the method for controlling a projector provided in the embodiments of the disclosure allow the user to achieve the purpose of controlling the projector by saying a voice signal to the voice assistant. Moreover, with respect to voice assistants manufactured by different manufacturers, the disclosure also provides corresponding systems to enable the user to control one or more projectors manufactured by the same manufacturer through the voice assistants.

In addition, the intelligent voice system provided in the embodiments of the disclosure allows the user to achieve the purpose of controlling the projector by saying a voice signal to the voice circuit device integrated in the projector.

After the user controls the projector to project the video platform interface through the voice assistant, the disclosure additionally provides a further control system to allow the user to control the projection situation of the video platform interface by the projector (e.g., searching, scrolling, stopping scrolling, playing a video item, adding a bookmark corresponding to a video item, playing a bookmark, etc.) by saying a voice signal to the voice assistant. Thereby, the disclosure provides the user with a novel, intuitive, and convenient projector control system.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. An intelligent voice system comprising:
a voice assistant;
a cloud service platform, connected to the voice assistant and adapted to manage the voice assistant;
a projector, configured to project a video platform interface, and
a management server, connected to the cloud service platform and the projector and configured to manage and control the projector,
wherein when the voice assistant receives a first voice signal for controlling the video platform interface, the voice assistant extracts a plurality of first keywords from the first voice signal and forwards the plurality of first keywords to the cloud service platform, wherein the plurality of first keywords comprises an alias corresponding to the projector and a first interface control command,
wherein the cloud service platform comprises a semantic analyzing program and the cloud service platform comprises a plurality of second interface control commands, the cloud service platform analyzes the first interface control command according to the semantic analyzing program, acquires one of the plurality of second interface control commands according to the first interface control command, and transmits the alias of the projector and the second interface control command corresponding to the first interface control command to the management server, and the management server accesses the projector in response to the alias and adjusts a projection situation of the video platform interface,
wherein the projector is connected to Internet, the projector comprises a storage device, and the storage device stores a first application, wherein after the first application is turned on, the first application is adapted to connect to a first website, the first website is adapted to provide the video platform interface, and the projector projects the video platform interface after receiving a video signal of the video platform interface, and
wherein, in response to the second interface control command corresponding to the first interface control command being a second interface control command comprising a play command and a play label, the video platform interface comprises a plurality of video items, each of the video items is provided with a corresponding item label, and the first application controls playback of a video content of a first video item among the plurality of video items according to the play command, wherein the item label of the first video item corresponds to the play label.

2. The intelligent voice system of claim 1, wherein the projector comprises a wired network medium or a wireless network medium.

3. The intelligent voice system of claim 1, wherein when the voice assistant receives a second voice signal, the voice assistant extracts a plurality of second keywords from the second voice signal and forwards the plurality of second keywords to the cloud service platform, wherein the plurality of second keywords comprises the alias corresponding to the projector and a first control command.

4. The intelligent voice system of claim 3, wherein the cloud service platform comprises a plurality of second control commands, the cloud service platform analyzes the first control command according to the semantic analyzing program, acquires one of the plurality of second control commands according to the first control command, and forwards the alias of the projector and the second control command corresponding to the first control command to the management server, and the management server accesses the projector in response to the alias and turns on the first application of the projector according to the second control command.

5. The intelligent voice system of claim 1, wherein a controller of the projector receives the second interface control command corresponding to the first interface control command and generates a third interface control command corresponding to the second interface control command for controlling an operation of the first application.

6. The intelligent voice system of claim 5, wherein, in response to the second interface control command corresponding to the first interface control command being a second interface control command comprising a video search command and a search keyword, the first application performs a search operation in the video platform interface according to the search keyword, and the projector projects a search result of the search operation.

7. The intelligent voice system of claim 5, wherein, in response to the second interface control command corresponding to the first interface control command being a second interface control command comprising an interface scroll command, the projector controls the first application to continuously scroll the video platform interface projected by the projector according to the interface scroll command.

8. The intelligent voice system of claim 5, wherein, in response to the second interface control command corresponding to the first interface control command being a second interface control command comprising a scroll stop command, the projector controls the first application to stop scrolling the video platform interface projected by the projector according to the scroll stop command.

9. The intelligent voice system of claim 5, wherein, in response to the second interface control command corresponding to the first interface control command being a second interface control command comprising a bookmark adding command and a first designated bookmark name, and the video platform interface projected by the projector comprising a first video content, the first application marks the first video content as the first designated bookmark name in the video platform interface according to the bookmark adding command.

10. The intelligent voice system of claim 5, wherein, in response to the second interface control command corresponding to the first interface control command being a second interface control command comprising a bookmark play command and a second designated bookmark name, the first application controls the video platform interface to play a second video content of the second designated bookmark name according to the bookmark play command.

11. The intelligent voice system of claim 5, wherein the third interface control command comprises at least one of a video search command signal and a search keyword, an interface scroll command signal, a scroll stop command signal, a play command signal and a play label, a bookmark adding command signal and a first designated bookmark name, and a bookmark play command and a second designated bookmark name, and the first application receives the third interface control command.

12. A method for controlling a projector adapted for the intelligent voice system of claim 1, the method comprising:
extracting, by the voice assistant, the plurality of first keywords from the first voice signal and forwarding the plurality of first keywords to the cloud service platform when the voice assistant receives the first voice signal for controlling the video platform interface, wherein the plurality of first keywords comprises the alias corresponding to the projector and the first interface control command, wherein the cloud service platform comprises the semantic analyzing program and the cloud service platform comprises the plurality of second interface control commands;
analyzing, by the cloud service platform, the first interface control command according to the semantic analyzing program, acquiring one of the plurality of second interface control commands according to the first interface control command, and transmitting the alias of the projector and the second interface control command corresponding to the first interface control command to the management server; and
accessing, by the management server, the projector in response to the alias and adjusting the projection situation of the video platform interface,
wherein the projector is connected to Internet, the projector comprises the storage device, and the storage device stores the first application, wherein after the first application is turned on, the first application is adapted to connect to the first website, the first website is adapted to provide the video platform interface, and the projector projects the video platform interface after receiving the video signal of the video platform interface,
wherein, in response to the second interface control command corresponding to the first interface control command being the second interface control command comprising the play command and the play label, the video platform interface comprises the plurality of video items, each of the video items is provided with the corresponding item label, and the first application controls playback of the video content of the first video item among the plurality of video items according to the play command, wherein the item label of the first video item corresponds to the play label.

13. The method of claim 12, wherein the projector comprises a wired network medium or a wireless network medium.

14. The method of claim 12, wherein when the voice assistant receives a second voice signal, the method further comprises:
extracting, by the voice assistant, a plurality of second keywords from the second voice signal and forwarding the plurality of second keywords to the cloud service platform, wherein the plurality of second keywords comprises the alias corresponding to the projector and a first control command.

15. The method of claim 14, wherein the cloud service platform comprises a plurality of second control commands, the method further comprising:
analyzing, by the cloud service platform, the first control command according to the semantic analyzing program, acquiring one of the plurality of second control commands according to the first control command, and forwarding the alias of the projector and the second control command corresponding to the first control command to the management server, wherein the management server accesses the projector in response to the alias and turns on the first application of the projector according to the second control command.

16. The method of claim 12, wherein a controller of the projector receives the second interface control command corresponding to the first interface control command and generates a third interface control command corresponding to the second interface control command for controlling an operation of the first application.

17. The method of claim 16, wherein, in response to the second interface control command corresponding to the first interface control command being a second interface control command comprising a video search command and a search keyword, the first application performs a search operation in the video platform interface according to the search keyword, and the projector projects a search result of the search operation.

18. The method of claim 16, wherein, in response to the second interface control command corresponding to the first interface control command being a second interface control command comprising an interface scroll command, the projector controls the first application to continuously scroll the video platform interface projected by the projector according to the interface scroll command.

19. The method of claim 16, wherein, in response to the second interface control command corresponding to the first interface control command being a second interface control command comprising a scroll stop command, the projector controls the first application to stop scrolling the video platform interface projected by the projector according to the scroll stop command.

20. The method of claim 16, wherein, in response to the second interface control command corresponding to the first interface control command being a second interface control command comprising a bookmark adding command and a first designated bookmark name, and the video platform interface projected by the projector comprising a first video content, the first application marks the first video content as the first designated bookmark name in the video platform interface according to the bookmark adding command.

21. The method of claim 16, wherein, in response to the second interface control command corresponding to the first interface control command being a second interface control command comprising a bookmark play command and a second designated bookmark name, and the first application controls the video platform interface to play a second video content of the second designated bookmark name according to the bookmark play command.

22. The method of claim 16, wherein the third interface control command comprises at least one of a video search command signal and a search keyword, an interface scroll command signal, a scroll stop command signal, a play command signal and a play label, a bookmark adding command signal and a first designated bookmark name, and a bookmark play command and a second designated bookmark name, and the first application receives the third interface control command.

* * * * *